(12) United States Patent
Inoue et al.

(10) Patent No.: US 6,232,927 B1
(45) Date of Patent: *May 15, 2001

(54) ARRAY ANTENNA APPARATUS FOR USE IN SPREAD SPECTRUM COMMUNICATIONS WITH A PARTICULAR INTERVAL BETWEEN ANTENNA ELEMENTS

(75) Inventors: Takashi Inoue, Tokyo; Yoshio Karasawa, Saitama, both of (JP)

(73) Assignees: ATR Adaptive Communications Research Laboratories, Kyoto; KDD Corporation, Tokyo, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,327

(22) Filed: Feb. 17, 1999

(30) Foreign Application Priority Data

Feb. 17, 1998 (JP) .................................................. 10-034561

(51) Int. Cl.[7] .................................................. H01Q 21/00
(52) U.S. Cl. .......................... 343/844; 343/853; 342/375
(58) Field of Search .................................. 333/844, 853; 342/165, 169, 170, 171, 172, 375, 378; 375/200, 203, 208, 211; 455/65

(56) References Cited

U.S. PATENT DOCUMENTS

| | | | |
|---|---|---|---|
| 3,780,372 | * 12/1973 | Unz | 343/844 |
| 4,843,402 | * 6/1989 | Clement | 343/844 |
| 5,274,389 | * 12/1993 | Archer et al. | 343/844 |
| 5,633,889 | 5/1997 | Schilling | 375/203 |
| 5,652,765 | 7/1997 | Adachi et al. | 375/211 |
| 5,721,554 | 2/1998 | Hall et al. | 342/165 |
| 5,781,845 | * 7/1998 | Dybdal et al. | 455/65 |
| 5,949,833 | * 9/1999 | Weerackody | 375/347 |

FOREIGN PATENT DOCUMENTS

| | | |
|---|---|---|
| 0777400A2 | 6/1997 | (EP). |
| 8204428 | 8/1996 | (JP). |

OTHER PUBLICATIONS

Patent Abstracts of Japan, vol. 12, No. 023; Dec. 26, 1996 (which corresponds to JP 8–204428 listed above).

Takashi Inoue et al., "Two–Dimensional Rake Reception Scheme for DS/CDMA Systems in DBF Antenna Configuration," (5 pages).

Takashi Inoue et al., "Channel Capacity Improvement in the Uplink of DS/CDMA Systems by Means of 2–Dimensional RAKE Reception Scheme," The Institute of Electronics, Information and Communication Engineers, Technical Report of IEICE. A–P97–103, RCS97–118, Oct. 1997, pp. 35–42.

* cited by examiner

*Primary Examiner*—Tan Ho

(57) ABSTRACT

An array antenna apparatus for use in spread spectrum communications is provided including a plurality of antenna elements aligned on a straight line. The array antenna apparatus is used in a receiving station for receiving spread-spectrum modulated radio signals having a wavelength of a predetermined carrier frequency transmitted from transmitting stations using a two-dimensional RAKE receiving method, and for performing spread spectrum communications in code division multiple access. The plurality of antenna elements are aligned such that an interval between antenna elements adjacent to each other among the plurality of antenna elements is set to a value which is larger than one half the wavelength of the carrier frequency and which is equal to or smaller than sixteen times the wavelength of the carrier frequency so as to generate grating lobes. In this case, the interval is preferably set to a value which is an integer or fractional (decimal) multiple of one half the wavelength of the carrier frequency which is greater than unity.

10 Claims, 14 Drawing Sheets

Preferred Embodiment

Fig.11 Preferred Embodiment Radiation Characteristics of Output of Multi-Beam Forming Circuit 7 (D=4.0 λ)

Preferred Embodiment Radiation Characteristics of Output of Multi-Beam Forming Circuit 7 (D=0.75 λ)

ARRAY ANTENNA APPARATUS FOR USE IN SPREAD SPECTRUM COMMUNICATIONS WITH A PARTICULAR INTERVAL BETWEEN ANTENNA ELEMENTS

BACKGROUND OF THE INVENTION

1. Field of the Invention

The present invention relates to an array antenna apparatus for use in spread spectrum communications, wherein the array antenna apparatus includes a plurality of antenna elements aligned on a straight line, and wherein the array antenna apparatus is provided for use in a receiving station which receives a spread-spectrum modulated radio signal having a wavelength of a predetermined carrier frequency transmitted from transmitting stations, using a two-dimensional RAKE receiving method, and which performs spread spectrum communications in code division multiple access.

2. Description of the Prior Art

In conventional spread spectrum communication methods, there has been available such a technique (a so-called RAKE receiving method) such that, by heightening a spreading ratio of spread-spectrum modulation and by broadening a frequency bandwidth (spreading bandwidth) of a spread-spectrum modulated signal, namely, by sufficiently shortening the chip duration of the spread-spectrum modulated signal relative to the change in the delay time (delay broadening or delay range) of multi-path waves, the multi-path wave signals are separated into individual wave signals as delayed pulses on the delay time base by the despread-spectrum technique, using a cross correlation between received signals and spreading codes, and then, the separated delayed pulses are combined. When enough spreading bandwidth cannot be taken so that multi-path waves cannot be separated into individual waves only by differences of the delay time, it is effective to adopt such a two-dimensional RAKE receiving method such that the multi-path wave signals are received by an antenna array in which antenna elements are arrayed or aligned on a straight line at an interval of a half-wavelength distance, and then, the multi-path wave signals are separated into individual waves by using both the differences of delay time, and differences of arrival angle (for example, See Takashi Inoue et al., "Channel Capacity Improvement in the Uplink of DS/CDMA Systems by Means of 2-Dimensional RAKE Reception Scheme", Technical Report of the Institute of Electronics, Information and Communication Engineers in Japan, A.P97-103, RCS97-118, October 1997).

FIG. 2 is a block diagram showing an implementation of a spread spectrum communication system of a prior art example, and FIG. 3 is a perspective view showing the concept of a two-dimensional RAKE receiving method of a prior art example.

Referring to FIG. 2, transmitting stations 100-1 to 100-K are equipped with data modulation sections 1-1 to 1-K, spreading modulation sections 2-1 to 2-K, RF transmitting sections (radio frequency transmitting sections) 3-1 to 3-K, and transmitting antennas 4-1 to 4-K, respectively. Spread spectrum signals S1-1 to S1-K transmitted from the plurality of K transmitting stations 100-1 to 100-K, respectively, arrive at a receiving station 200 via a multi-path transmission line 300.

In the receiving station 200, the signals are received by an array antenna 500 comprising a plurality of M antenna elements 5-1 to 5-M arrayed or aligned on a straight line at an antenna element interval D of, for example, a half-wavelength ($\lambda/2$). Individual received signals S2-1 to S2-K are converted into intermediate frequency signals or baseband frequency signals by RF receiving sections (radio frequency receiving sections) 6-1 to 6-M, respectively, and then, the converted signals are converted into M types or kinds of beam space signals S3-1 to S3-M by a multi-beam forming circuit 7. In this case, the multi-beam forming circuit 7 as shown in FIG. 4 is a well circuit configuration and comprises an embodiment where eight beam space signals S31-1–S3-8 are generated based on eight input signals S1-1–S1-8 as an example. The multi-beam forming circuit 7 comprises:

(a) 180° phase shifters PS11 to PS14, PS21 to PS24, PS41 and PS44, 90° phase shifters PS31 to PS32, 1350 phase shifters PS33 and PS34, and 215° phase shifters PS35 and PS36; and (b) in-phase combiners (or adders) AD11 to AD18, AD21 to AD28 and AD31 to AD38.

Next, the individual beam space signals S3-1 to S3-M outputted from the multi-beam forming circuit 7 are distributed or divided into a plurality of K signals, and then, the divided K signals are inputted to K two-dimensional RAKE receiving sections 8-1 to 8-K, respectively. For example, the two-dimensional RAKE receiving section 8-1 of the first user channel, as shown in FIGS. 2 and 5, comprises a plurality of M despreading circuits 811-1 to 811-M, a plurality of M RAKE receiving circuits 812-1 to 812-M, a combining circuit 813, and a data demodulation section 814. In the two-dimensional RAKE receiving section 8-1 of the first user channel, the distributed m-th (m=1, 2, ..., M) beam space signal S3-m of the first user channel is despread by the despreading circuit 811-m, and a RAKE combined signal S41-m of the m-th beam in the first user channel is generated by the RAKE receiving circuit 812-m. The RAKE combined signals S41-1 to S41-M of the first to M-th beams in the first user channel are maximum-ratio combined so as to generate a two-dimensional RAKE combined signal S5-1 of the first user channel. After that, the generated two-dimensional RAKE combined signal S5-1 of the first user channel is demodulated so as to generate a demodulated signal S6-1 of the first user channel by the data demodulation section 814. The other two-dimensional RAKE receiving sections 8-2 to 8-K of the second to K-th user channels also operate in a similar manner, so as to generate demodulated signals S6-2 to S6-K of the second to K-th user channels, respectively.

That is, since the two-dimensional RAKE receiving sections 8-1 to 8-K obtain their outputs by maximum-ratio combining the input signals in a two-dimensional domain of time and space, the multi-path waves can be separated into individual waves with both differences of delay time and differences of arrival angle, this results in advantageous effects such that higher-quality data transmission can be realized by efficiently separating multi-path waves.

FIG. 6 is a plan view showing a multi-path transmission line of the spread spectrum communication system of FIGS. 1 and 2. FIG. 6 shows only one transmitting station 100 and one receiving station 200, wherein spread-spectrum radio signals transmitted from the transmitting stations 100 are received by the receiving station 200 via, for example, seven paths P0 to P6. In this case, the receiving station 200, as shown in FIG. 7, receives spread spectrum radio signals with a delay range.

In a case of less broadening of the arrival angle of multi-path waves that arrive at the receiving station 200, in order to separate the individual multi-path waves based on differences of arrival angle, it is necessary to utilize an array antenna having a very large number of antenna elements. In other words, the hardware scale becomes relatively large.

SUMMARY OF THE INVENTION

An essential object of the present invention is to provide an array antenna apparatus for spread spectrum communications, wherein the array antenna apparatus includes a plurality of antenna elements arrayed or aligned on the straight line and is provided for use in a receiving station that receives spread-spectrum modulated radio signals having a wavelength of a predetermined carrier frequency transmitted from transmitting stations by a two-dimensional RAKE receiving method and performs spread spectrum communications in code division multiple access, and wherein the array antenna apparatus is capable of compensating degradations of signal quality due to multi-path fading by efficiently separating multi-path waves with a limited number of antenna elements, which is due to the hardware scale restriction, and is thus capable of providing high-quality information transmission.

According to one aspect of the present invention, there is provided an array antenna apparatus for use in spread spectrum communications, wherein the array antenna apparatus includes a plurality of antenna elements aligned on a straight line. The array antenna apparatus is used in a receiving station for receiving spread-spectrum modulated radio signals having a wavelength of a predetermined carrier frequency transmitted from transmitting stations using a two-dimensional RAKE receiving method, and for performing spread spectrum communications in code division multiple access. The plurality of antenna elements are aligned such that an interval between antenna elements adjacent to each other among the plurality of antenna elements is set to a value which is larger than one half the wavelength of the carrier frequency and which is equal to or smaller than sixteen times the wavelength of the carrier frequency so as to generate grating lobes. In this case, the interval is preferably set to a value which is a multiple greater than unity of a half wavelength of the carrier frequency.

Accordingly, when incoming directions of a plurality of delayed waves coming from the same transmitting station are concentrated around the direction of the transmitting station, the multi-path waves can be efficiently separated into individual waves, using narrow beams so that degradations of signal quality due to fading fluctuations can be compensated efficiently. Thus, in the technical fields where multi-path fading occurs in transmission line, such as land mobile communications or the like, degradations of signal quality due to fading can be compensated so that the communication capacity for accommodation by one base station can be increased.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments of the present invention will now be described below with reference to the attached drawings.

Figure 1:
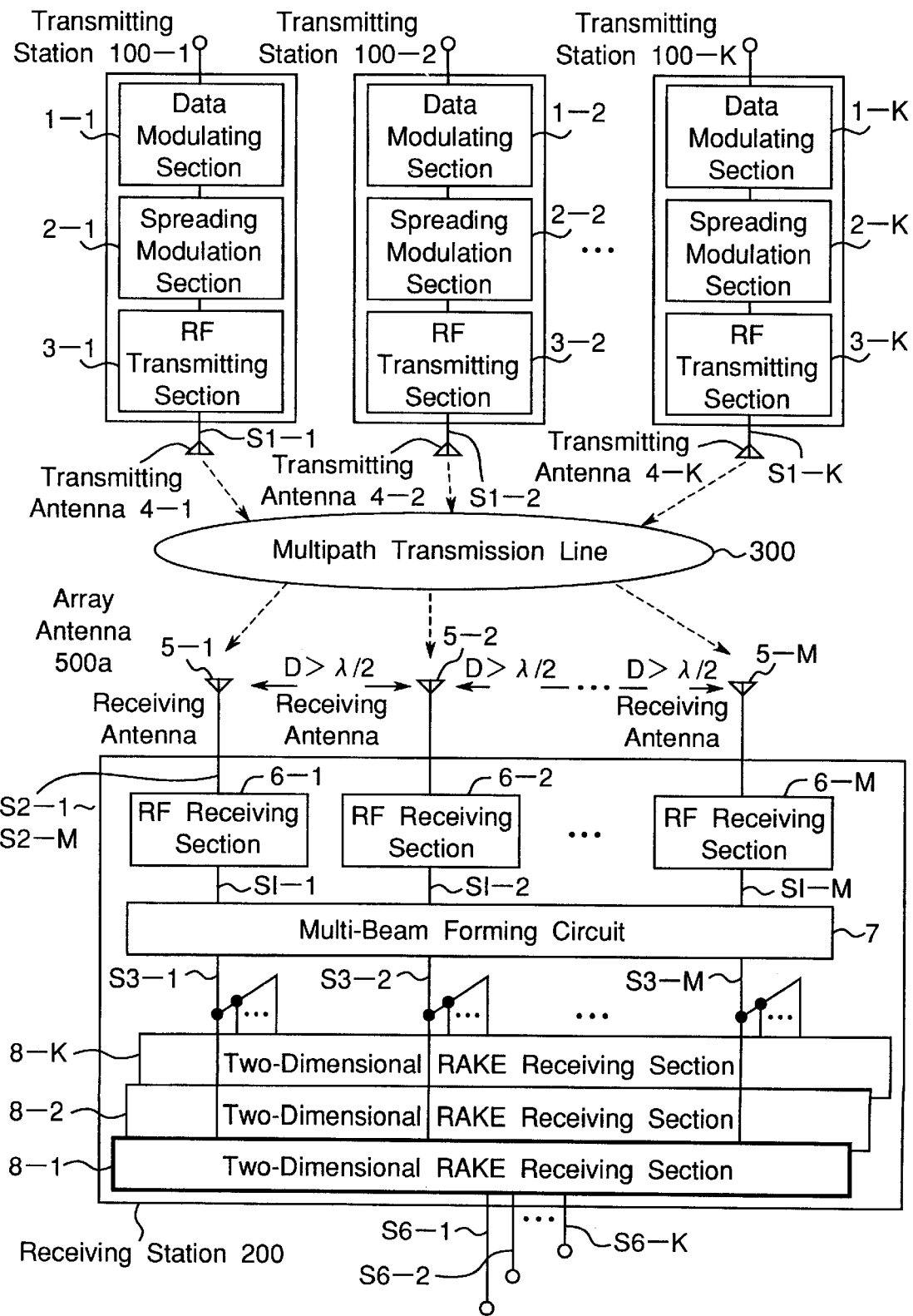
FIG. 1 is a block diagram showing an implementation; of a spread spectrum communication system according to a preferred embodiment of the present invention.

FIG. 1 is a block diagram depicting a spread spectrum communication system according to the preferred embodiment of the present invention.

Referring to FIG. 1, the spread spectrum communication system of the preferred embodiment has an antenna array 500a which comprises a plurality of M receiving antenna elements 5-1 to 5-M arrayed or aligned on a straight line (linear array), and is provided for use in a receiving station 200 that performs spread spectrum communications in code division multiple access by receiving spread-spectrum modulated radio signals having a wavelength of a predetermined carrier frequency transmitted from transmitting stations 100 by a two-dimensional RAKE receiving method.

Figure 2:
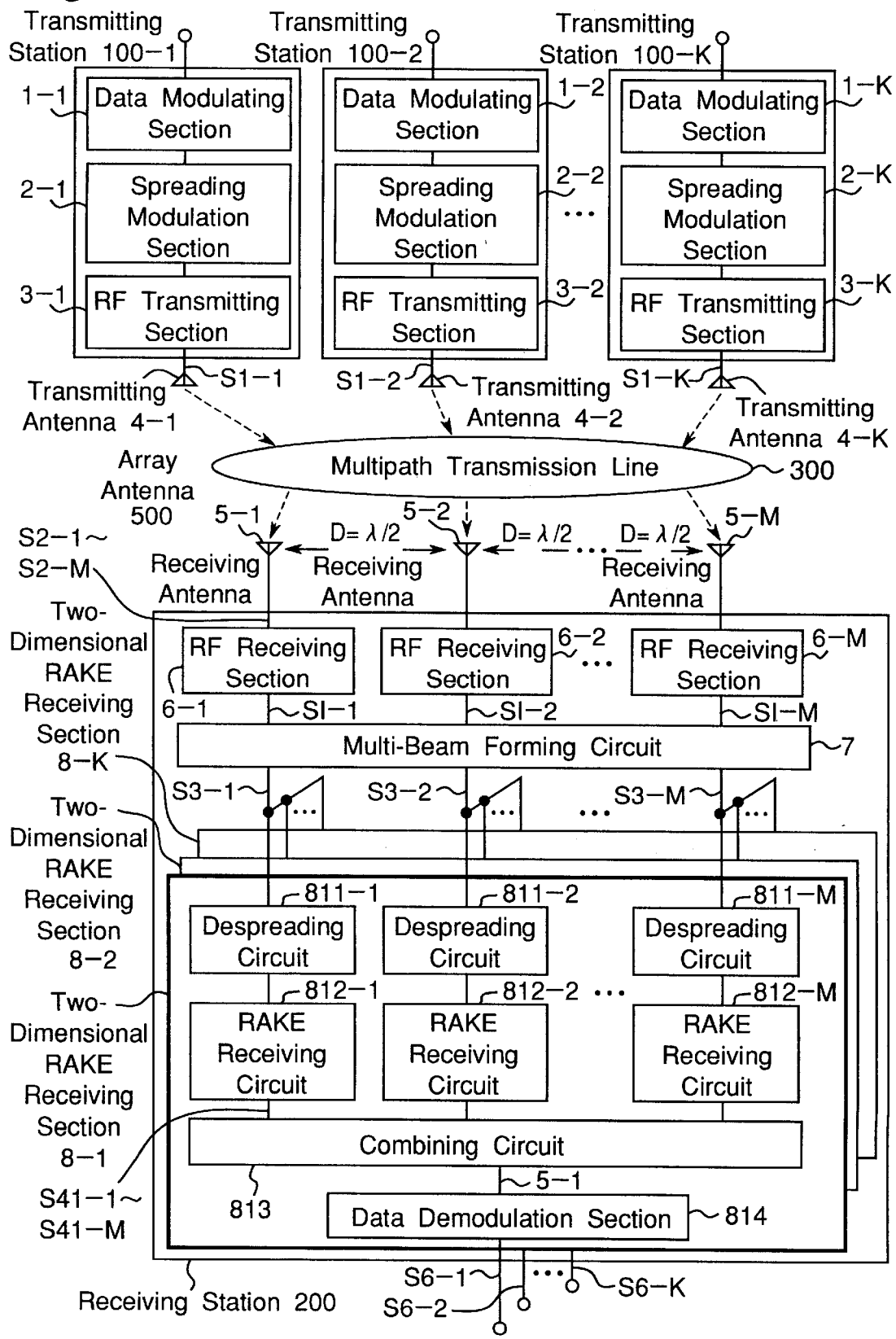
FIG. 2 is a block diagram showing an example of an implementation of prior art a spread spectrum communication system.
Figure 3:
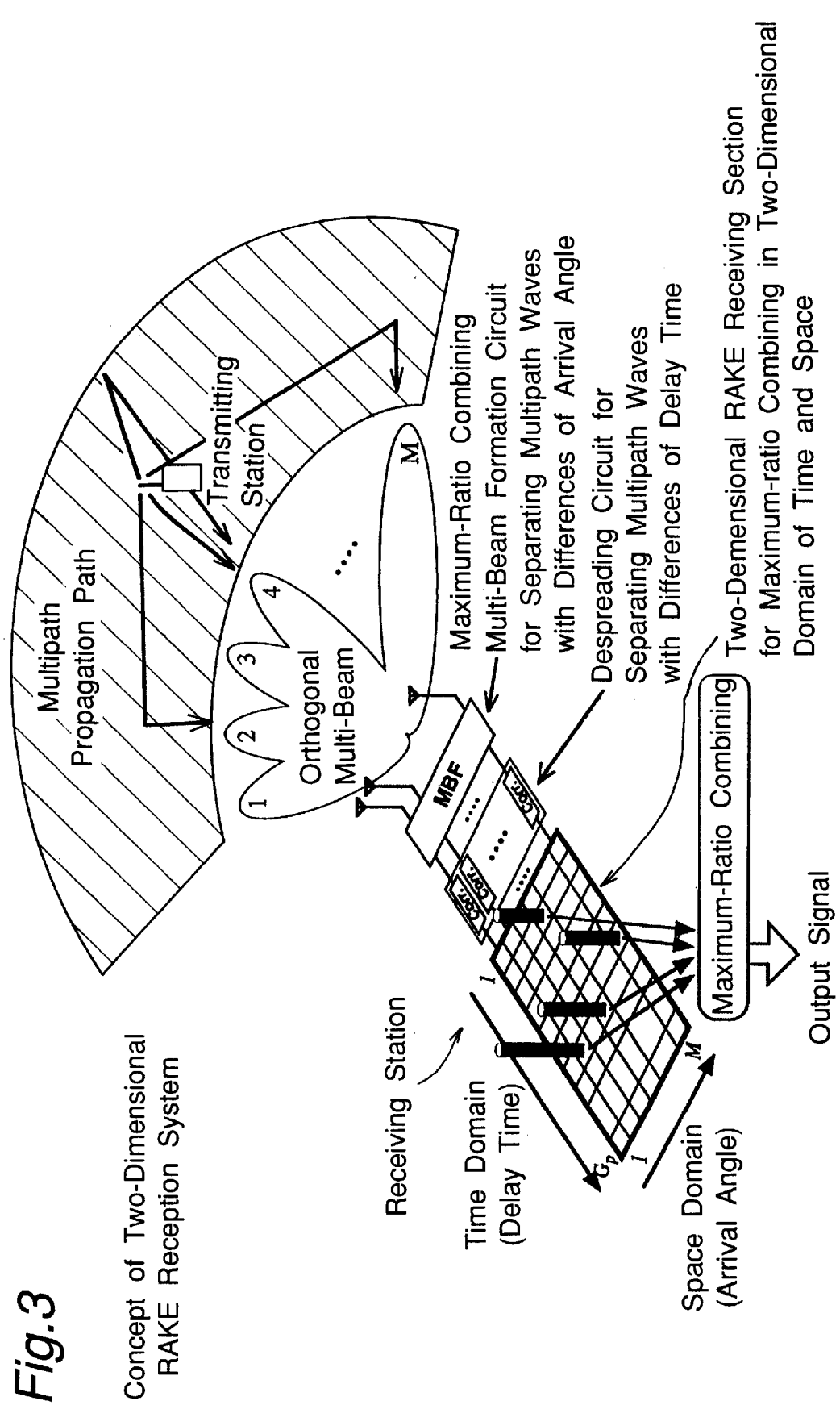
FIG. 3 is a perspective view showing the concept of a two-dimensional RAKE receiving method in accordance with the prior art.
Figure 4:
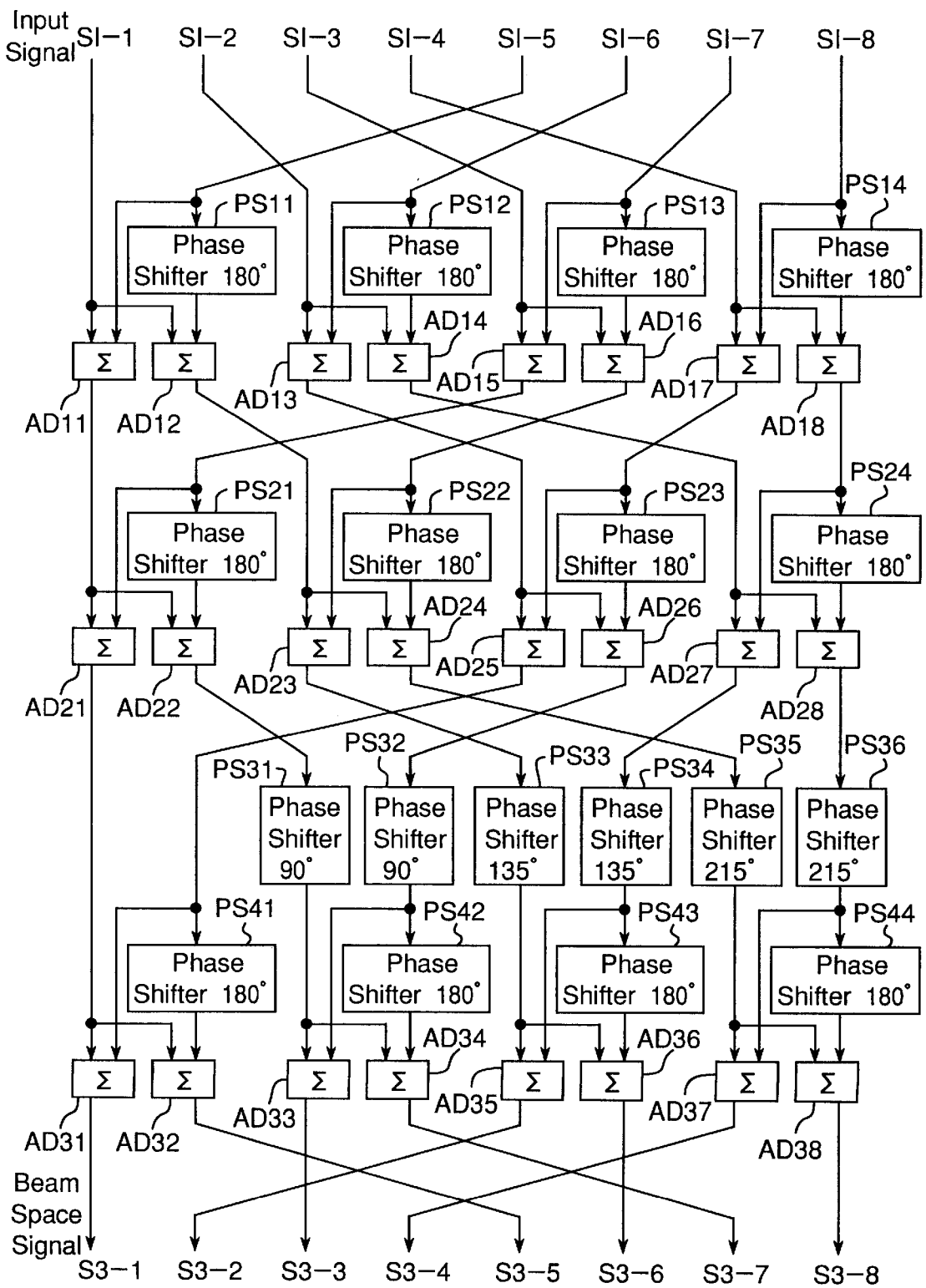
FIG. 4 is a block diagram showing an implementation depicted in the multi-beam forming circuit 7 of FIGS. 1 and 2.

The spread spectrum communication system differs from the spread spectrum communication system of the prior art example of FIG. 2, and is characterized, in that the plurality of antennas are arrayed or aligned in such an arrangement that an interval D between antenna elements adjacent to each other among the plurality of antenna elements 5-1 to 5-M is set to a value which is larger than 0.5 times or one half the above-mentioned wavelength ($\lambda$) of the carrier frequency and which is equal to or smaller than sixteen times the wavelength ($16\lambda$) of the above-mentioned carrier frequency. Preferably, the interval D is set to a multiple which is greater than unity of one half the wavelength ($\lambda/2$) of the above-mentioned carrier frequency.

Referring to FIG. 1, from a plurality of K transmitting stations 100-1 to 100-K, radio signals spread-spectrum modulated with different spreading codes arrive at the receiving station 200 via a multi-path transmission line 300. The received radio signals are frequency-converted into intermediate frequency signals or baseband signals in the RF receiving sections 6-1 to 6-M, and after that, the frequency-converted signals are converted into multi-beam signals S3-1 to S3-M by the multi-beam forming circuit 7, which then outputs the multi-beam signals S3-1 to S3-M.

Figure 8:
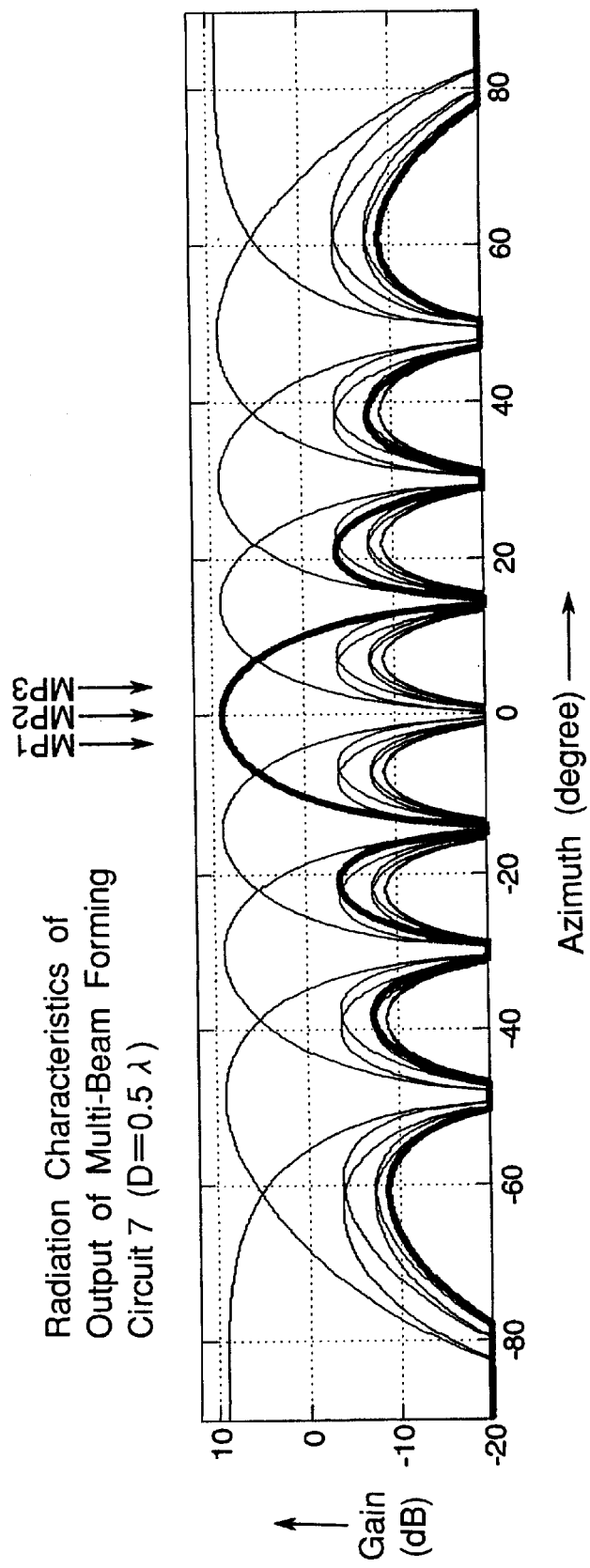
FIG. 8 is a graph showing the radiation characteristics (antenna interval D=0.5λ) of outputs from the multi-beam forming circuit of the prior art example shown in FIG. 2.
Figure 9:
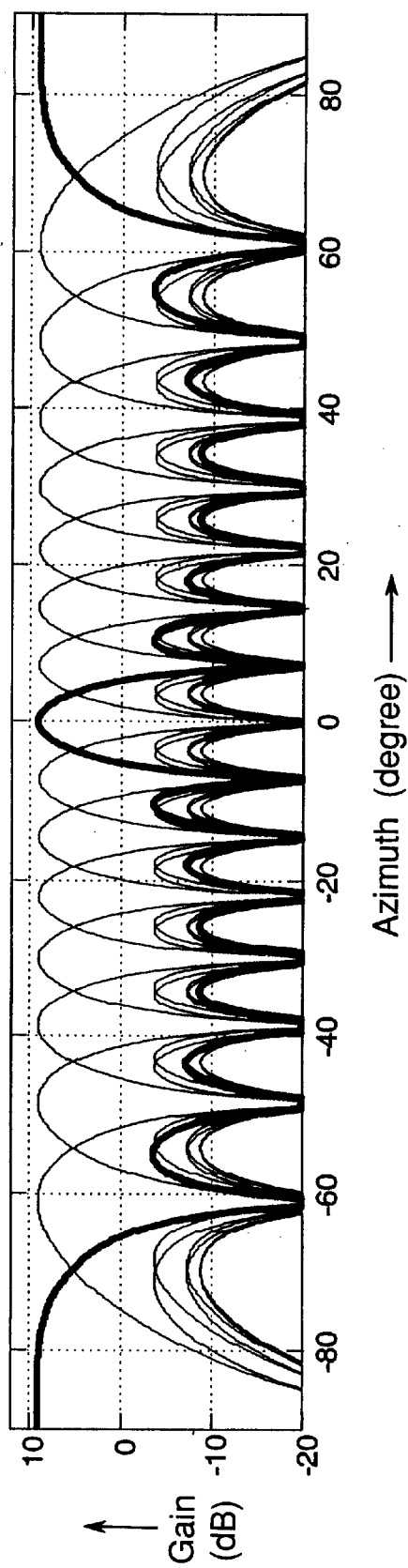
FIG. 9 is a graph showing the radiation characteristics (antenna interval D=1.0λ) of outputs from the multi-beam forming circuit of the preferred embodiment shown in FIG. 1.
Figure 10:
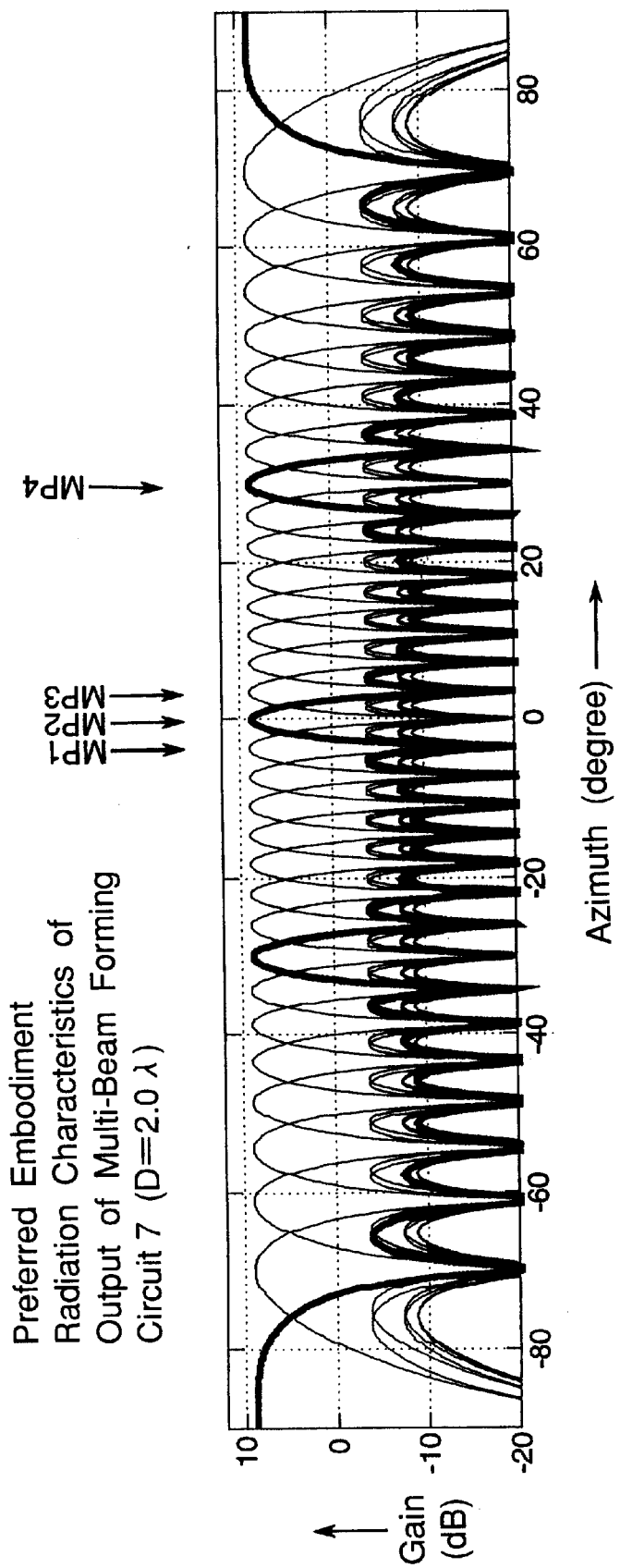
FIG. 10 is a graph showing the radiation characteristics (antenna interval D=2.0λ) of outputs from the multi-beam forming circuit of the preferred embodiment shown in FIG. 1.
Figure 11:
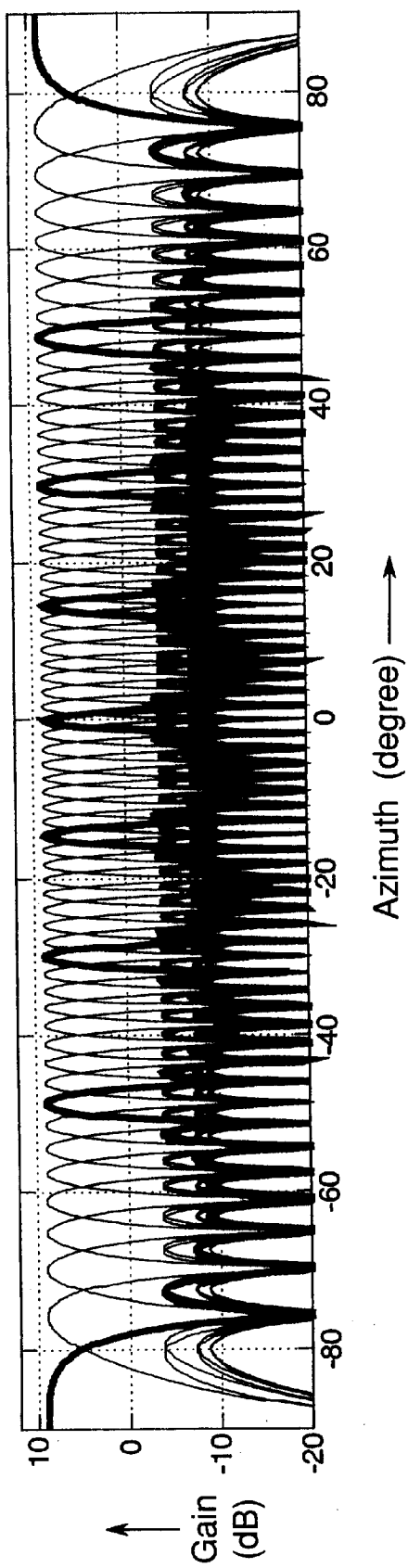
FIG. 11 is a graph showing the radiation characteristics (antenna interval D=4.0λ) of outputs from the multi-beam forming circuit of the preferred embodiment shown in FIG. 1.
Figure 12:
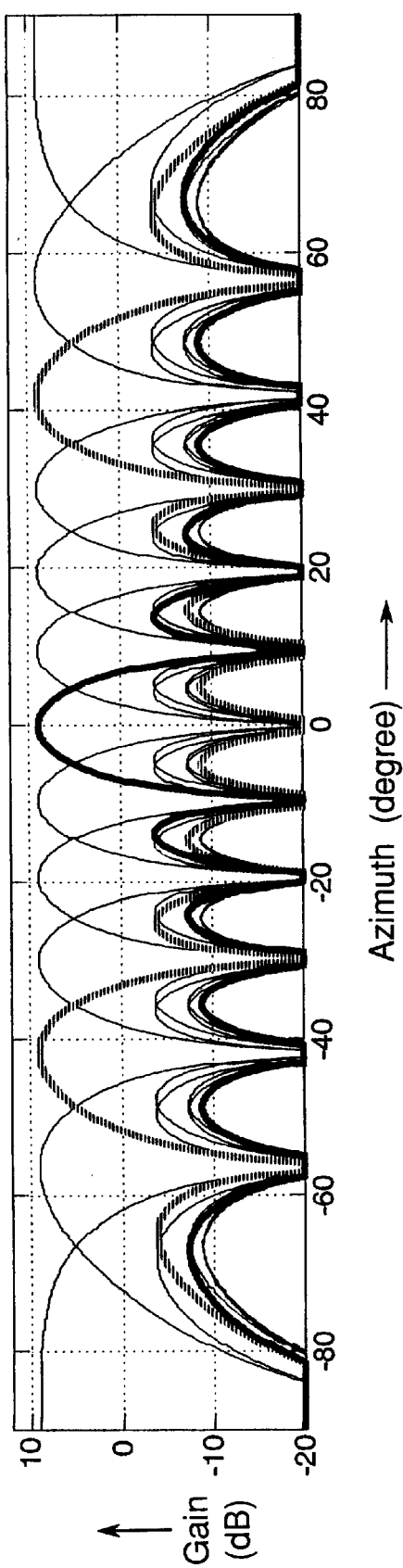
FIG. 12 is a graph showing the radiation characteristics (antenna interval D=0.75λ) of outputs from the multi-beam forming circuit of the preferred embodiment shown in FIG. 1.

In the prior art method using an array antenna having the receiving antenna element interval D of a half-wavelength long ($\lambda/2$), since the radiation characteristics of the outputs from the multi-beam forming circuit 7 are shown in FIG. 8, multi-path waves MP1 and MP2, MP3 in FIG. 8 are received by the same beam drawn in bold lines, so that these multi-path waves cannot be separated into individual waves in the space domain. On the other hand, in the present invention, in the case of, for example, an antenna array having a receiving antenna element interval D of, for example, 2-wavelengths ($\lambda 2$) long, since radiation characteristics of the outputs from the multi-beam forming circuit 7 are shown in FIG. 10, the multi-path waves MP1, MP2 and MP3 in FIG. 10 are received by different beams, respectively, so that these multi-path waves can be separated into individual waves in the space domain. The multi-beam signals separated by the differences of arrival angles are distributed or divided into K signals, respectively, and then, the K divided signals are processed in the respective user channels.

Figure 5:
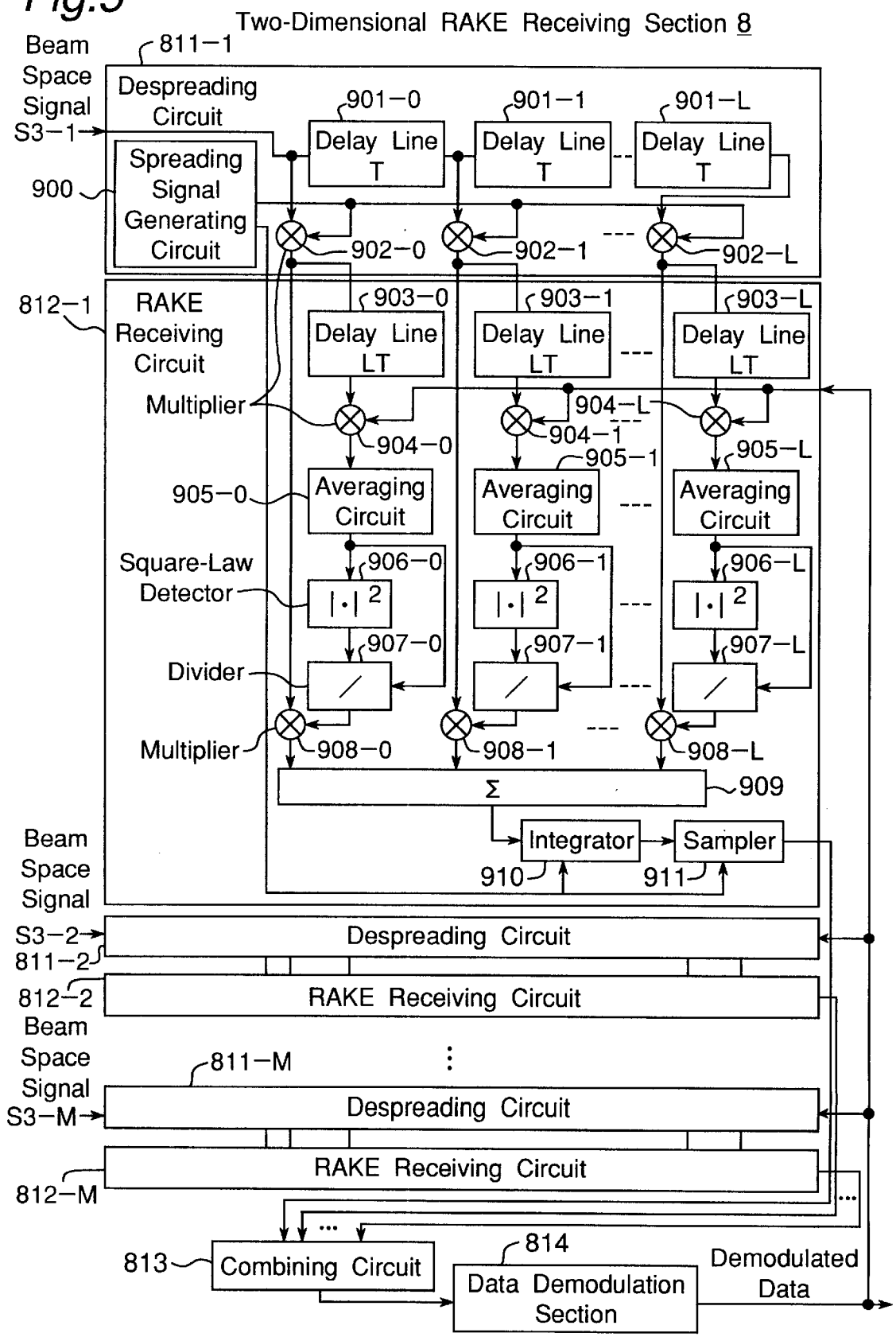
FIG. 5 is a block diagram showing an implementation of the two-dimensional RAKE receiving section depicted in FIGS. 1 and 2.
Figure 6:
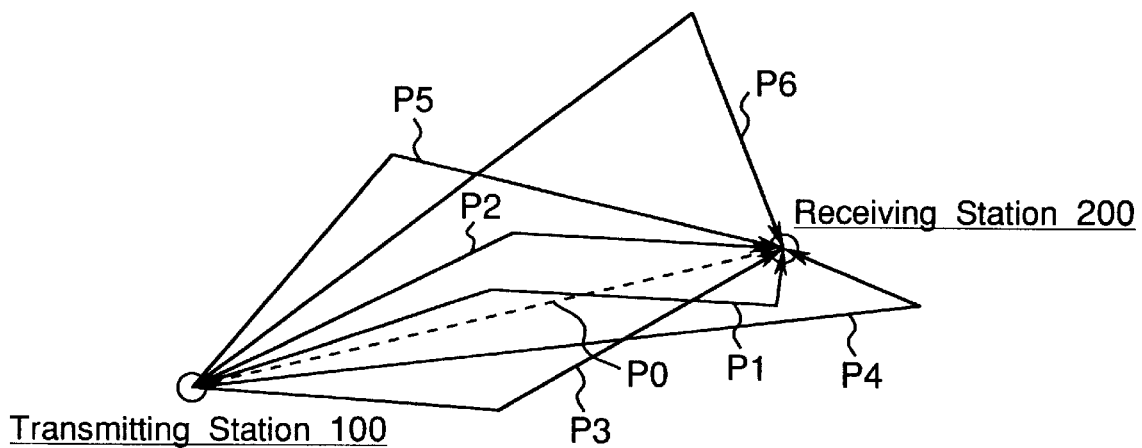
FIG. 6 is a plan view showing a multi-path transmission line of the spread spectrum communication systems of FIGS. 1 and 2.
Figure 7:
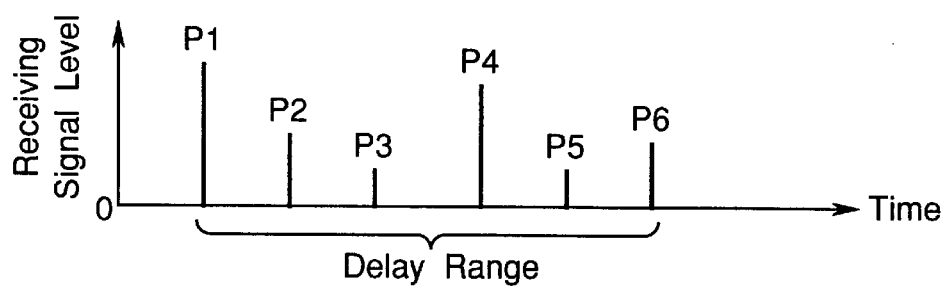
FIG. 7 is a timing chart showing the delay range in the spread spectrum communication systems of FIGS. 1 and 2.

For example, as shown in FIG. 5 in the two-dimensional RAKE receiving section 8-1 of the first user channel, the beam space signals are despread by despreading circuits 811-1 to 811-M which are arranged for parallel processing of M types or kinds of beam space signal outputs. Since these despreading circuits 811-1 to 811-M perform the despreading process by using the spreading code used in the first transmitting station 100-1, signal components derived from the other second to K-th transmitting stations 100-2 to 100-K are eliminated. The despread signals of the individual beam space signals are RAKE combined by a plurality of M sets of RAKE receiving circuits 812-1 to 812-K arranged in parallel, so as to generate RAKE combined signals of M beams, and then, the RAKE combined signals of M beams are combined by the combining circuit 813, so as to generate a two-dimensional RAKE received signal. The two-dimensional RAKE received signal is demodulated by a data demodulation section 814, so that data derived from the first transmitting station 100-1 is taken out or extracted and outputted. The two-dimensional RAKE receiving sections 8-2 to 8-K of the second to K-th user channels also operate in a similar manner, so that data derived from the second to K-th transmitting stations 100-2 to 100-K are taken out or extracted and outputted, respectively.

In the preferred embodiment of the present invention, shown in FIG. 1, if the antenna element interval is broadened so as to be larger than the one half wavelength ($>\lambda/2$), then the beams are directed in a plurality of directions as radiation characteristics of the beam outputs, this resulting in generation of grating lobes as shown by bold lines shown in FIG. 10. The more the antenna element interval is broadened, the more the grating lobes in one beam would increase in number, and their interval would be narrower. On the other hand, it is considered that multi-path waves coming from the same user station are generally concentrated toward the user station. Therefore, by properly or appropriately setting the antenna element interval D, multi-path waves derived from the same transmitting station and coming in different directions can be prevented from being received by the same beam.

Further, in the two-dimensional RAKE receiving method of the prior art example, if the transmitting stations 100 are different in direction from one another, then their respective signals would be received by different beams. On the other hand, in the case of the method according to the preferred embodiment, signals are received by the same beam if the directions of the transmitting stations 100 are coincident with the directions of the grating lobes, respectively. For example, the signals coming from MP2 and MP4 shown in FIG. 10 are received by the same beam. However, in each of the transmitting stations 100, since the received signals have been spread-modulated by different spreading codes, these received signals can be separated into individual signals by the despreading circuits 811.

EXPERIMENTAL EXAMPLES

Figure 13:
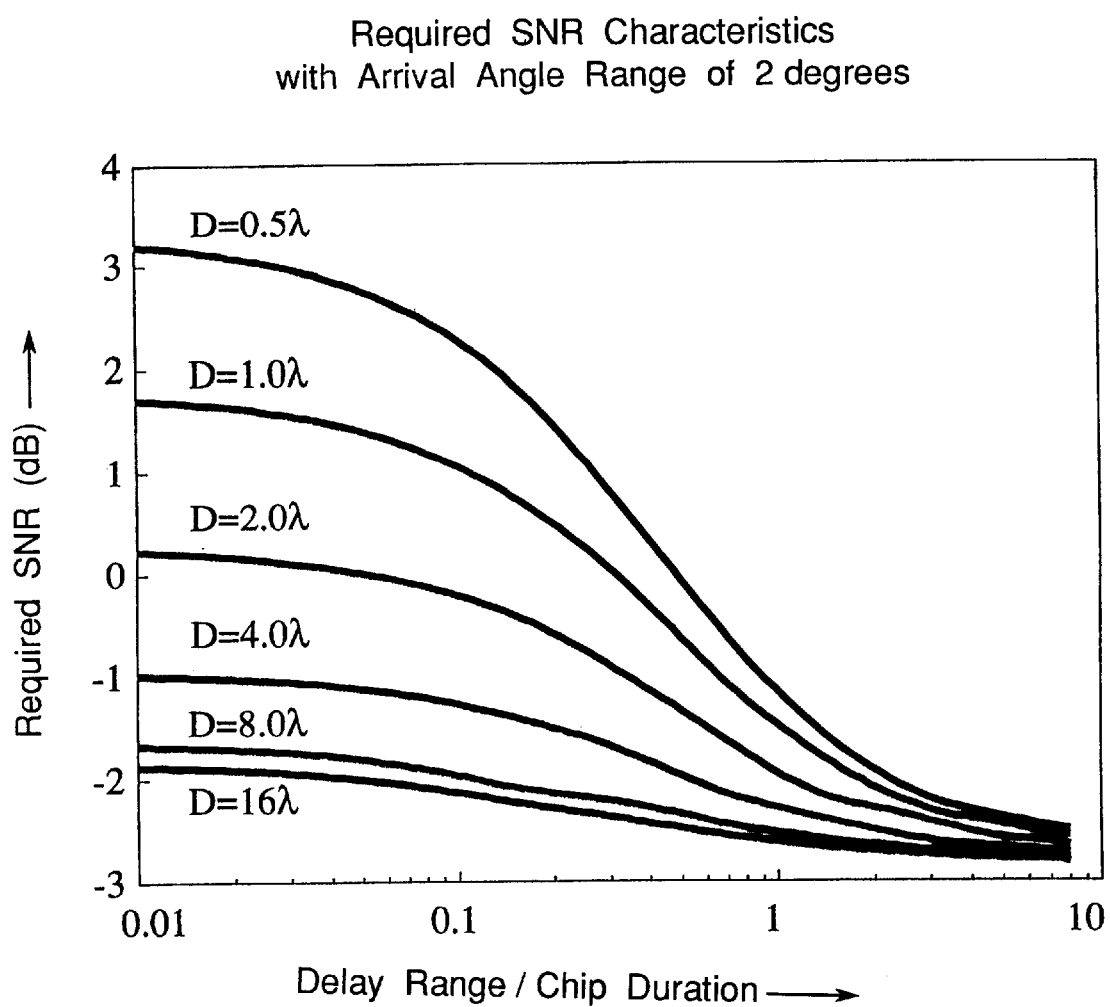
FIG. 13 is a graph showing the required SNR characteristics (for an arrival angle of 2°) with respect to delay range/chip duration in the preferred embodiment shown in FIG. 1.
Figure 14:
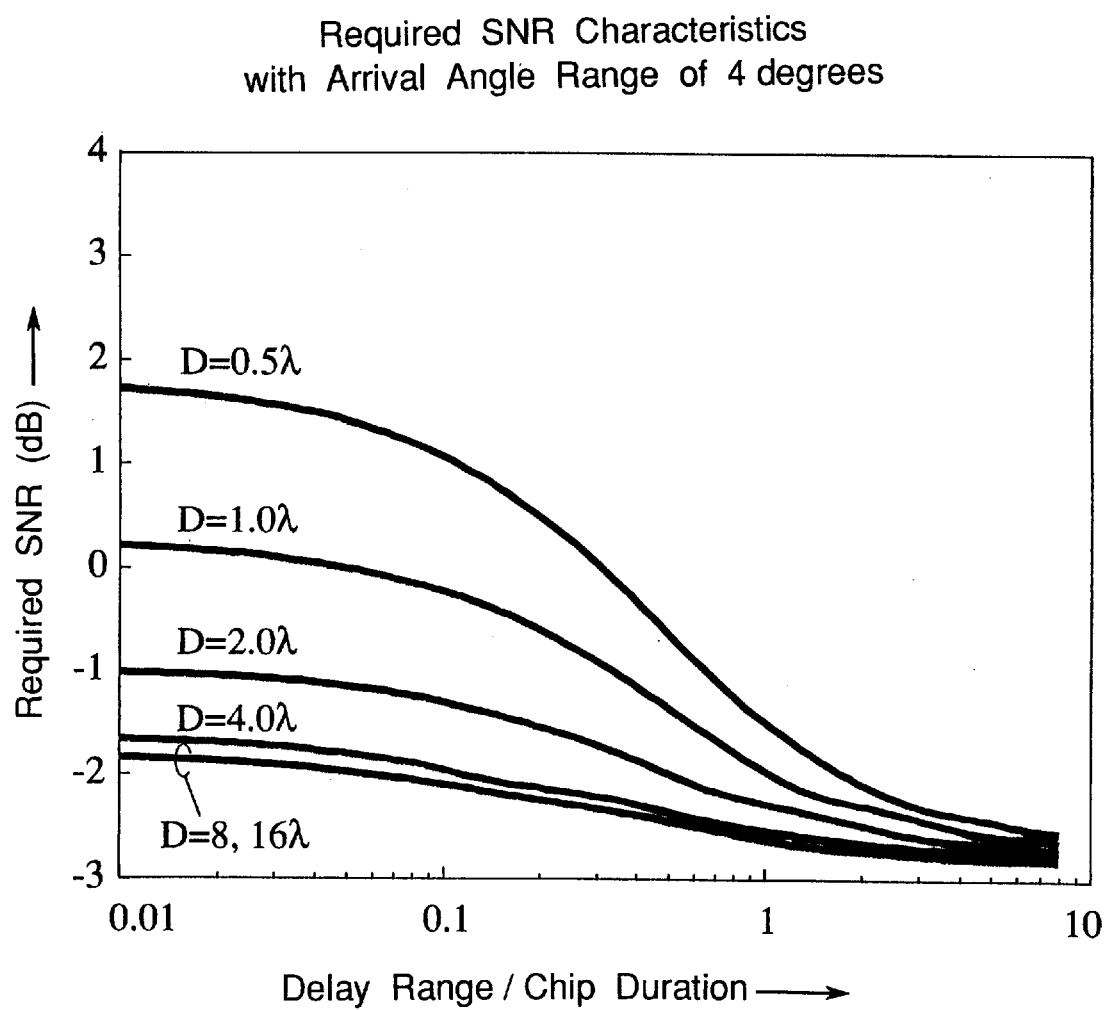
FIG. 14 is a graph showing the required SNR characteristics (for an arrival angle of 4°) with respect to delay range/chip duration in the preferred embodiment shown in FIG. 1.
Figure 15:
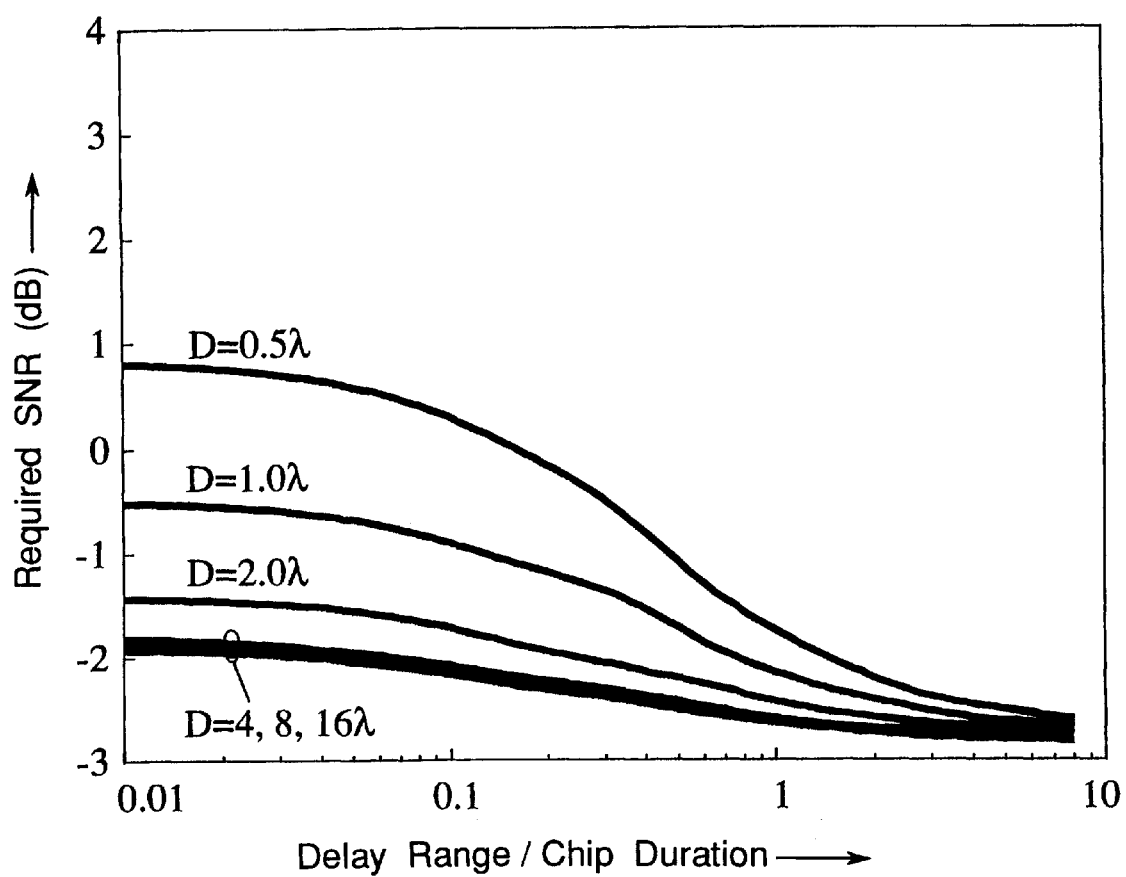
FIG. 15 is a graph showing the required SNR characteristics (for an arrival angle of 6°) with respect to delay range/chip duration in the preferred embodiment shown in FIG. 1.

FIGS. 9 to 12 are graphs showing the radiation characteristics (antenna interval D=$1.0\lambda$, $2.0\lambda$, $4.0\lambda$, $0.75\lambda$) of the outputs from the multi-beam forming circuit 7 of the present preferred embodiment, respectively, for the four (4) antenna intervals noted above. FIGS. 13 to 15 are graphs showing required SNR (Signal to Noise power Ratio) characteristics (for arrival angles of 2°, 4° and 6°) with respect to delay range/chip duration in the present preferred embodiment. It is noted that the symbol $\lambda$ denotes the wavelength of the carrier frequency of the carrier signal of the spread-spectrum radio signal.

FIGS. 8 to 12 show the radiation characteristics formed by the multi-beam forming circuit 7, wherein the bold lines in the figures represent radiation characteristics of outputs of beam signals in the front direction. As apparent from FIGS. 8 to 12, it can be understood that the beam widths decrease with increasing values of the antenna element interval D. That is, increasing the value of the antenna element interval D makes it possible to separate and take out or extract individual multi-path waves even when the arrival angles of the multi-path waves are concentrated on the direction of the user station. Then, when the value of the antenna element interval D becomes larger than one half the wavelength of the carrier frequency ($>\lambda/2$), there are formed major lobes having the equal gain in a plurality of directions (so called grating lobes). As the value of the antenna element interval D increases, the number of grating lobes increases, and the intervals between grating lobes become narrower. When the intervals of grating lobes become nearly equal to the broadening or range of the arrival angles of the multi-path waves, then the multi-path waves of different arrival angles would be taken out as the same beam output, so that the resolution of arrival angles of multi-path waves would no longer be enhanced even if the interval D is broadened any more with the beam width narrowed.

Whereas the number of beams shown in the bold lines with an interval of D=$0.75\lambda$ is 1 (FIG. 12), the number of beams in the bold dotted lines is 2, this showing that the number of grating lobes differs depending on the beam outputs. Generally speaking, when the value of interval D is any integral multiple greater than unity of 0.5λ such as 0.75λ, 1.0λ, 1.5λ, . . . , the numbers of grating lobes in the individual beam outputs become equal to one another (where beams in ±90° directions are each counted as 0.5 beam). Otherwise, with values of the interval D other than those values, the number of grating lobes differs depending on the beams. Different numbers of beams would cause interference power due to the grating lobes to change, and this results in characteristic variations among beam outputs. Thus, it is desirable that the value of interval D is a greater than unity multiple including, for example, a whole number or a fractional/decimal portion thereof of 0.75λ such as 0.5λ, 1.0λ, 1.5λ. . . 16λ.

Further, referring to FIGS. 13 to 15, the horizontal axis is a ratio of delay range to chip duration (a reciprocal of frequency bandwidth of a spread signal) of multi-path waves. As apparent from FIGS. 13 to 15, as the value of the interval D increases, the required SNR characteristics are remarkably improved. Then, the characteristic improvement is generally saturated at an interval of D=16λ. This is because the interval of grating lobes has become similar to the arrival angle range of the multi-path waves.

As described above, in this preferred embodiment, by setting the interval D between the antenna elements adjacent to each other among a plurality of receiving antenna elements 5-1 to 5-M, to a value which is larger than one half the wavelength (λ/2) of the carrier frequency and which is equal to or smaller than sixteen times the wavelength (16λ) of the carrier frequency, the plurality of antenna elements are arrayed or aligned, in which the interval D is more preferably set to a multiple of one half the wavelength (λ/2) of the carrier frequency which is greater than one. Accordingly, when a plurality of delayed waves coming from the same transmitting station are concentrated around the direction of the transmitting station, the multi-path waves can be efficiently separated into individual waves, using narrow beams so that degradations of signal quality due to fading fluctuations can be efficiently compensated. Therefore, in the technical fields where multi-path fading occurs in transmission line such as land mobile communications or the like, degradations of signal quality due to fading can be compensated, and the communication capacity for accommodation by one base station can be increased.

As described in detail above, according to the present invention, in an array antenna apparatus which comprises a plurality of antenna elements arrayed or aligned on the straight line and which serves for use in a receiving station which receives spread-spectrum modulated radio signals having a predetermined wavelength of a carrier frequency transmitted from transmitting stations by a two-dimensional RAKE receiving method, and which performs spread spectrum communications in code division multiple access, wherein the plurality of antenna elements are arrayed or aligned in such an arrangement that an interval between antenna elements adjacent to each other among the plurality of antenna elements is set to a value which is larger than half the wavelength of the carrier frequency and which is equal to or smaller than sixteen times the wavelength of the carrier frequency, and more preferably, the plurality of antenna elements are arrayed or aligned in such an arrangement that the interval of antenna elements is set to multiple of one half the wavelength of the carrier frequency which is greater than unity.

Therefore, when incoming directions of a plurality of delayed waves coming from the same transmitting station are concentrated around the direction of the transmitting station, the multi-path waves can be efficiently separated into individual waves, using narrow beams so that degradations of signal quality due to fading fluctuations can be compensated efficiently. Thus, in the technical fields where multi-path fading occurs in transmission line, such as land mobile communications or the like, degradations of signal quality due to fading can be compensated so that the communication capacity for accommodation by one base station can be increased.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An array antenna apparatus for use in spread spectrum communications, comprising:

a plurality of non-rotatable antenna elements aligned on a straight line, wherein said array antenna apparatus is used in a receiving station for receiving spread-spectrum modulated radio signals having a wavelength of a predetermined carrier frequency transmitted from transmitting stations using a two-dimensional RAKE receiving method, and for performing spread spectrum communications in code division multiple access, and wherein said plurality of antenna elements are aligned such that a uniform interval between antenna elements adjacent to each other among the plurality of antenna elements is set to a value which is larger than one half the wavelength of the carrier frequency and which is equal to or smaller than sixteen times the wavelength of the carrier frequency so as to generate grating lobes, thereby improving a signal to noise power ratio characteristic.

2. The array antenna apparatus as claimed in claim 1, wherein said interval is set to a value which is a multiple greater than unity of one half wavelength of the carrier frequency.

3. The array antenna apparatus as claimed in claim 1, wherein said interval is set to a value which is an integer multiple of one half the wavelength of the carrier frequency.

4. The array antenna apparatus as claimed in claim 1 wherein said interval is set to a value which is a multiple of a whole number or a fraction thereof which is greater than unity.

5. The array antenna apparatus as claimed in a claim 1 wherein said interval is set to a value which is a multiple of one half the wavelength of the carrier frequency and where the multiple is a fractional or decimal portion of a whole number greater than one.

6. An array antenna apparatus for use in spread spectrum communications, comprising:

a plurality of non-rotatable antenna elements aligned on a straight line, wherein said array antenna apparatus is used in a receiving station for receiving spread-spectrum modulated radio signals having a wavelength of a predetermined carrier frequency transmitted from transmitting stations using a two-dimensional RAKE receiving method, and for performing spread spectrum communications in code division multiple access, and wherein said plurality of non-rotatable antenna elements are aligned such that a uniform interval between antenna elements adjacent to each other among the plurality of antenna elements is set to a value which is a multiple, greater than unity, of one half wavelength of the carrier frequency so as to generate grating lobes for improving a signal to noise power ratio characteristic.

7. A method of generating grating lobes in an array of antenna elements used for receiving spread-spectrum modulated signals having a wavelength of a predetermined carrier frequency, comprising:

aligning a plurality of non-rotatable antenna elements in said array in a straight line; and providing a uniform mutual separation between said plurality of non-rotatable antenna elements which is a multiple of one half wavelength of the carrier frequency so as to generate grating lobes and wherein said multiple is greater than unity whereby a plurality of grating lobes are generated so as to improve a signal to noise power ratio characteristic.

8. A method according to claim 7 wherein said multiple comprises a whole number greater than unity.

9. A method according to claim 7 wherein said multiple comprises a fractional or decimal portion of a whole number greater than unity.

10. A method according to claim 7 wherein said separation is greater than one half wavelength of the carrier frequency or equal to or less than sixteen times said one half wavelength.

* * * * *